United States Patent [19]

Doguchi

[11] 4,342,144

[45] Aug. 3, 1982

[54] METHOD OF MANUFACTURING A THERMALLY INSULATING SASH BAR

[75] Inventor: Nobushige Doguchi, Toyama, Japan

[73] Assignee: Yoshida Kogyo K.K., Tokyo, Japan

[21] Appl. No.: 196,787

[22] Filed: Oct. 14, 1980

[30] Foreign Application Priority Data

Oct. 22, 1979 [JP] Japan ................................ 54-135128

[51] Int. Cl.³ ................................................ B23P 17/00

[52] U.S. Cl. .................................... 29/155 R; 29/418; 29/527.1; 52/731; 264/46.6; 264/46.7; 264/139

[58] Field of Search ................. 52/731, 732, 730, 403, 52/729, 98, 99; 29/155 R, 416, 418

[56] References Cited

U.S. PATENT DOCUMENTS

| | | | |
|---|---|---|---|
| 3,856,902 | 12/1974 | Kirkpatrick | 264/45.2 |
| 3,992,769 | 11/1971 | Jackson | 29/418 |
| 4,185,439 | 1/1980 | Bischilici | 29/418 |

*Primary Examiner*—Leon Gilden

*Attorney, Agent, or Firm*—Bucknam and Archer

[57] ABSTRACT

A method of manufacturing a thermally insulating sash bar from an elongated hollow metallic sash bar including a pair of spaced outer members connected by a pair of spaced first and second inner members so as to define between the outer members a pair of longitudinally extending first and second channels and a longitudinally extending hollow chamber. A mass of foamable and thermally insulating synthetic resin is introduced into the first channel and then cured to fill the latter with the cured or thermally insulating synthetic resin. Then, a longitudinal gap is formed in and along each of the first and second inner members. The longitudinal gap in the second inner member is covered with a thermally insulating strip. Finally, a mass of the foamable and thermally insulating synthetic resin is introduced into the second channel and then cured to fill the latter with the cured or foamed thermally insulating synthetic resin.

6 Claims, 25 Drawing Figures

METHOD OF MANUFACTURING A THERMALLY INSULATING SASH BAR

BACKGROUND OF THE INVENTION

1. Field of the Invention

The present invention relates to a method of manufacturing a thermally insulating sash bar.

2. Prior Art

Japan Patent Laid-Open Publication (Kokai) No. 54-119739 discloses a method of manufacturing a thermally insulating sash bar. As shown in FIGS. 1*a* to 1*g*, the prior method comprises: (a) providing an elongated hollow metallic sash bar A including a pair of spaced interior and exterior outer members 1,2 connected by a pair of first and second inner members 3,4 so as to define between the outer members 1,2 a longitudinally extending hollow chamber 5 and a pair of longitudinally extending first and second channels 6,7 (FIG. 1*a*); (b) forming a longitudinal dinal gap 9 in and along the first inner member 3 by use of a cutter 8 (FIG. 1*b*); (c) covering the longitudinal gap in the first inner member 3 with a thermally insulating strip 10 (FIG. 1*c*); (d) then introducing a mass of thermally insulating synthetic resin into and curing the same within the first channel 6 to fill the latter with the cured thermally insulating synthetic resin 11 (FIG. 1*d*); (e) then forming a longitudinal gap 12 in and along the second inner member 4 by use of a cutter 8 (FIG. 1*e*); (f) covering the longitudinal gap 12 in the second inner member 4 with a thermally insulating strip 10 (FIG. 1*f*); and (g) then introducing a mass of the thermally insulating synthetic resin into and curing the same within the second channel 7 to fill the latter with the cured thermally insulating synthetic resin 11 (FIG. 1*g*).

Thus, the longitudinal gaps 9,12 in the first and second inner members 3,4 are formed at absolutely separate stages of process, i.e. the steps (b) and (e) above. This requires two separate cutting stations in the assembly line, making the assembly line complicated and costly. Yet, if there is only one cutting station in the assembly line, it is necessary to bring the sash bar A back to such one and the same cutting station for the step (e) (after the first channel 6 has been filled with the cured thermally insulating synthetic resin 11), which is very time-consuming.

SUMMARY OF THE INVENTION

It is therefore a primary object of the present invention to provide a method of manufacturing a thermally insulating sash bar, with which increased degree of productivety can be achieved.

Another object of the invention is to provide a method of manufacturing a thermally insulating sash bar, which requires only a less number of stations in the assembly line.

According to the present invention, a method of manufacturing a thermally insulating sash bar comprises: (a) providing an elongated hollow metallic sash bar including a pair of spaced outer members and a pair of spaced first and second inner members extending between the outer members so as to define therebetween a pair of longitudinally extending first and second channels, respectively; (b) introducing a mass of thermally insulating synthetic resin into and curing the same within the first channel to fill the latter with the cured thermally insulating synthetic resin; (c) then forming a longitudinal gap in and along each of the first and second inner members; (d) covering the longitudinal gap in the second inner member with a thermally insulating strip; and (e) then introducing a mass of the thermally insulating synthetic resin into and curing the same within the second channel to fill the latter with the cured thermally insulating synthetic resin.

Many other advantages, features and additional objects of the present invention will become manifest to those versed in the art upon making reference to the detailed description and the accompanying drawings in which preferred embodiments incorporating the principles of the present invention are shown by way of illustrative example.

DETAILED DESCRIPTION OF THE PREFERRED EMBODIMENTS

Figure 1A:
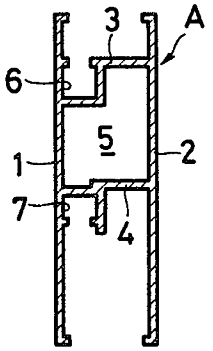
FIG.1a PRIOR ART
FIGS. 1*a* to 1*g* are cross-sectional views illustrating a series of steps of a prior art method of manufacturing a thermally insulating sash bar.
Figure 1B:
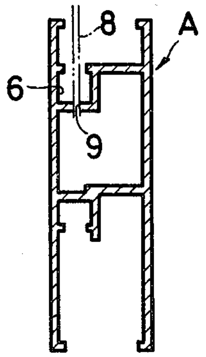
FIG.1b PRIOR ART
Figure 1C:
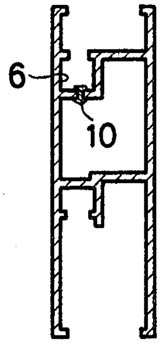
FIG.1c PRIOR ART
Figure 1D:
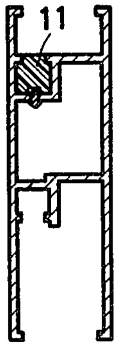
FIG.1d PRIOR ART
Figure 1E:
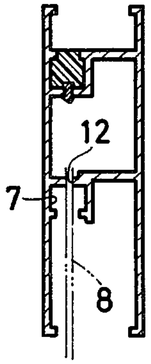
FIG.1e PRIOR ART
Figure 1F:
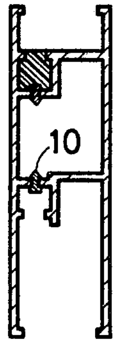
FIG.1f PRIOR ART
Figure 1G:
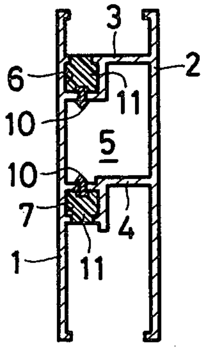
FIG.1g PRIOR ART
Figure 2A:
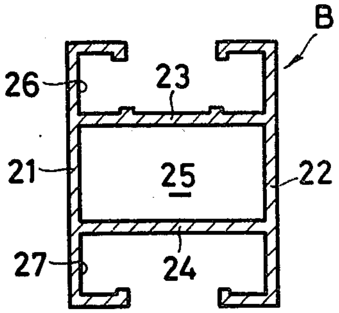
FIGS. 2*a* to 2*e* are cross-sectional views illustrating a series of steps of a method of manufacturing a thermally insulating sash bar according to the present invention.

FIG. 2*a* cross-sectionally shows an elongated, hollow extruded aluminum sash bar B which is used here as a starting material for a thermally insulating sash bar B' described below. The sash bar B includes a pair of spaced interior and exterior (first and second) outer members 21,22 connected by a pair of spaced first and second inner members 23,24 so as to define between the outer members 21,22 a pair of longitudinally extending first and second channels 26,27 and a longitudinally extending hollow chamber 25.

Figure 2B:
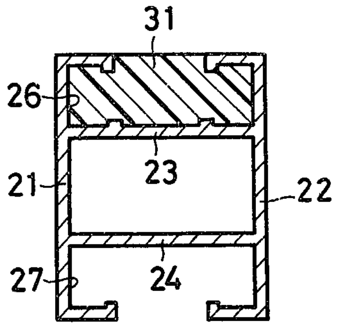
Figure 2C:
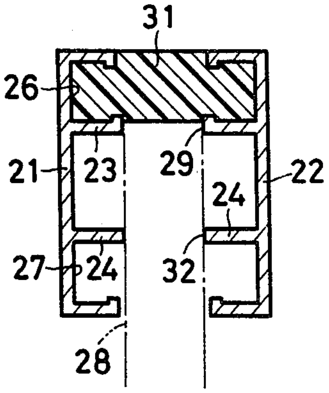

A mass of foamable and thermally insulating synthetic resin (hereinafter referred to as "foamable synthetic resin") such as polyurethane is introduced into the first channel 26 and then cured to fill the latter with the cured or foamed synthetic resin 31 (FIG. 2*b*). Then, a pair of longitudinal gaps 29,32 is formed in and along the first and second inner members 23,24, respectively, by means of a cutter 28 (FIG. 2*c*).

Figure 2D:
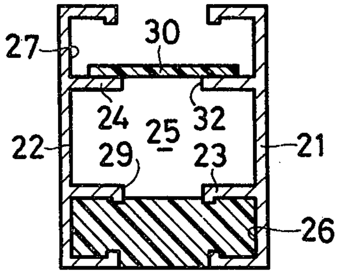
Figure 2E:
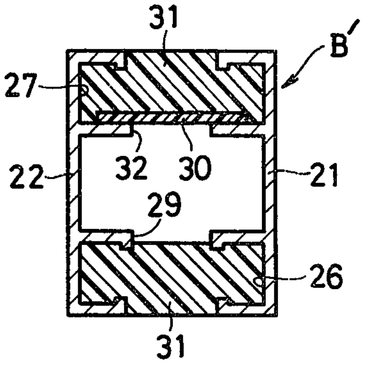

After that, the longitudinal gap 32 in the second inner member 24 is covered with a thermally insulating strip 30, preferably made of polyester (FIG. 2*d*). Finally, like the step of FIG. 2*b*, a mass of the foamable synthetic resin is introduced into the second channel 27 and then cured to fill the latter with the cured or foamed synthetic resin 31 (FIG. 2*e*). The centrally hollow, thermally insulating sash bar B' has thus been produced.

As mentioned above, both the longitudinal gaps 39,32 are formed at the same time at one and the same cutting station (or cutter 28) in the assembly line. And, the longitudinal gap 29 is formed after the first channel 26 has been filled with the foamed synthetic resin 31, requiring no special covering strip (30) for the gap 29 which covering would have been necessary if the gap 29 were formed before the step of FIG. 2*b*.

FIGS. 3*a* to 3*e* illustrate a second embodiment in which a modified sash bar C (FIG. 3*a*) is used as the starting material. The modified sash bar C includes a pair of spaced interior and exterior (first and second) outer members 21,22 connected by a first inner member 23 so as to define between the outer members 21,22 a longitudinally extending first channel 26. The sash bar C further includes a pair of second inner members 24,24 each longitudinally extending on and along one of the outer members 21,22. The second inner members 24,24 transversely extend toward and terminate short of each other to define therebetween a longitudinal gap 32.

Figure 3A:
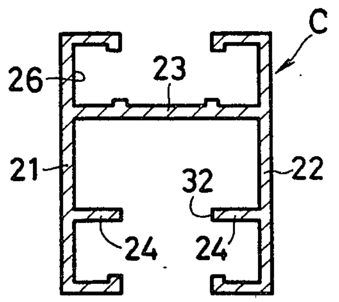
FIGS. 3*a* to 3*e* are views similar to FIGS. 2*a* to 2*e*, but illustrating a second embodiment.
Figure 3B:
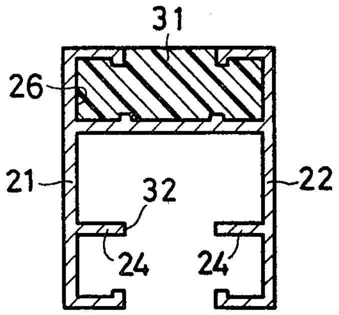
Figure 3C:
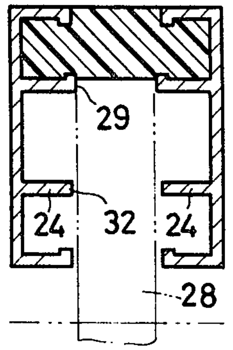
Figure 3D:
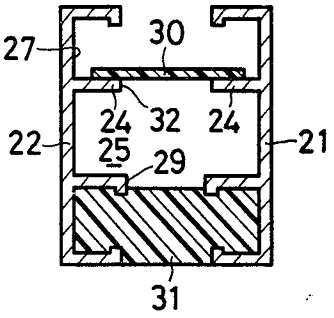
Figure 3E:
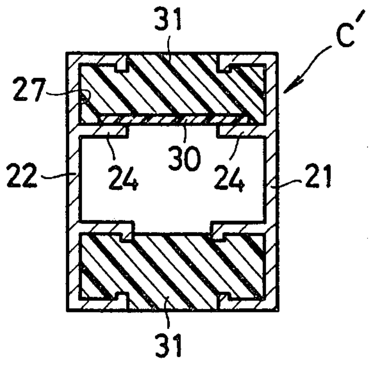

A mass of the foamable synthetic resin (same as used in the preceding embodiment) is introduced into the first channel 26 and then cured to fill the latter with the cured or foamed synthetic resin 31 (FIG. 3*b*). Then, a longitudinal gap 29 is formed in and along the first inner member 23 by means of a cutter 28, as shown in FIG. 3*c*.

After that, the longitudinal gap 32 defined by the second inner members 24,24 is covered with a thermally insulating strip 30, thereby providing between the outer members 21,22 a longitudinally extending second channel 27 as well as a longitudinally extending hollow chamber 25. Finally, like the step of FIG. 3*b*, a mass of the foamable synthetic resin is introduced into the second channel 27 and then cured to fill the latter with the cured or foamed synthetic resin 31 (FIG. 2*e*). The centrally hollow, thermally insulating sas- bar C' has thus been produced, which is just the same as the sash bar B' of FIG. 2*e*.

Figure 4:
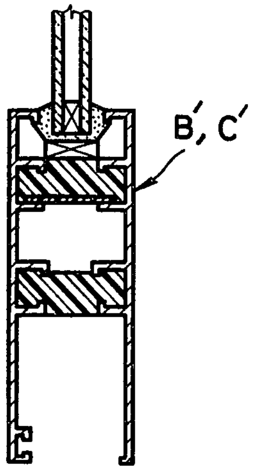
FIGS. 4 and 5 are fragmentary cross-sectional views of sash windows in which the thermally insulating sash bars manufactured according to the invention are used.
Figure 5:
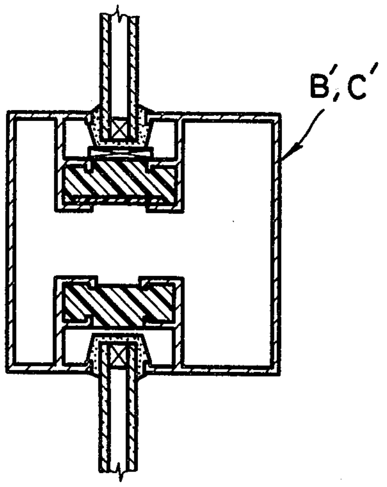

FIGS. 4 and 5 are fragmentary cross-sectional views of sash windows in which the thermally insulating sash bar B', C' manufactured according to the invention is used.

FIGS. 6*a* to 6*e* illustrate a third embodiment in which a modified sash bar D (FIG. 6*a*) is used as the starting material. The modified sash bar D includes a pair of spaced first and second outer members 21,22 having generally J-shaped and I-shaped cross sections, respectively. The first and second outer members 21,22 are connected by a pair of spaced first and second inner members 23,24 so as to define between the outer members 21,22 a pair of longitudinally extending first and second channels 26,27 and a longitudinally extending hollow chamber 25. The first channel 26 has a generally cross-shaped cross section.

Figure 6A:
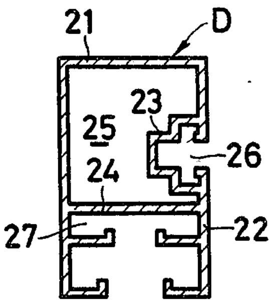
FIGS. 6*a* to 6*e* are cross-sectional views illustrating a third embodiment.
Figure 6B:
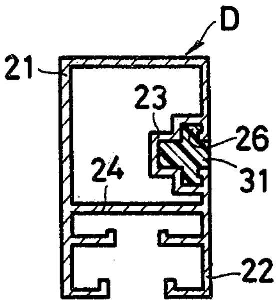
Figure 6C:
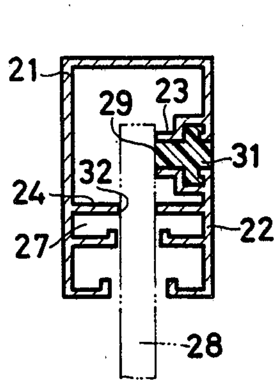

A mass of the foamable synthetic resin (same as used in the preceding embodiments) is introduced into the first channel 26 and then cured to fill the latter with the cured or foamed synthetic resin 31 (FIG. 6*b*). Then, a pair of longitudinal gaps 29,32 is formed in and along the first and second inner members 23,24, respectively, by means of a cutter 28 (FIG. 6*c*).

Figure 6D:
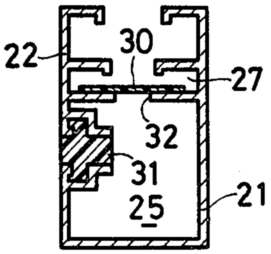
Figure 6E:
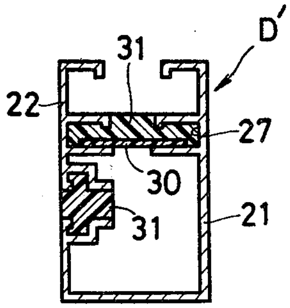

After that, the longitudinal gap 32 in the second inner member 24 is covered with a thermally insulating strip 30 (FIG. 6*d*). Finally, like the step of FIG. 6*b*, a mass of the foamable synthetic resin is introduced into the second channel 27 and then cured to fill the latter with the cured or foamed synthetic resin 31 (FIG. 6*e*). The centrally hollow, thermally insulating sash bar D' has thus been produced.

Figure 7:
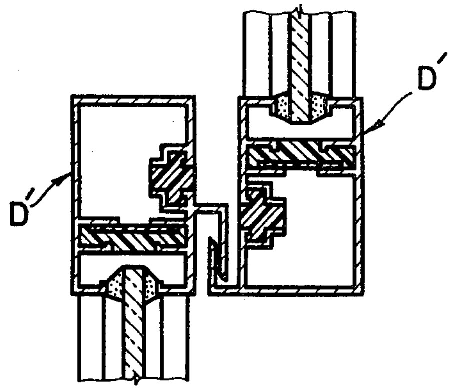
FIG. 7 is a fragmentary cross-sectional view of pair of interior and exterior sash windows in which the insulating sash bars manufactured according to the third embodiment are used.

FIG. 7 is a fragmentary cross-sectional view of a pair of interior and exterior sash windows in which the thermally insulating sash bars D' are used.

Although various minor modifications may be suggested by those versed in the art, it should be understood that I wish to embody within the scope of the patent warrented hereon, all such embodiments are reasonably and properly come within the scope of my contribution to the art.

What is claimed is:

1. A method of manufacturing a thermally insulating sash bar, comprising the steps of:
   - (a) providing an elongated hollow metallic sash bar including a pair of spaced outer members and a pair of spaced first and second inner members extending between said outer members so as to define therebetween a pair of longitudinally extending first and second channels, respectively;
   - (b) introducing a mass of thermally insulating synthetic resin into and curing the same within said first channel to fill the latter with the cured thermally insulating synthetic resin;
   - (c) then forming a longitudinal gap in and along each of said first and second inner members;
   - (d) covering the longitudinal gap in said second inner member with a thermally insulating strip; and
   - (e) then introducing a mass of the thermally insulating synthetic resin into and curing the same within said second channel to fill the latter with the cured thermally insulating synthetic resin.

2. A method according to claim 1, said thermally insulating synthetic resin being foamable.

3. A method according to claim 2, the foamable synthetic resin comprising polyurethane.

4. A method of manufacturing a thermally insulating sash bar, comprising the steps of:
   - (a) providing an elongated hollow metallic sash bar including a pair of spaced outer members, a first inner member extending between said outer members so as to define therebetween a longitudinally extending first channel, and a pair of second inner members each longitudinally extending on and along one of said outer members, said second inner members transversely extending toward and terminating short of each other to define therebetween a longitudinal gap;
   - (b) introducing a mass of thermally insulating synthetic resin into and curing the same within said first channel to fill the latter with the cured thermally insulating synthetic resin;
   - (c) then forming a longitudinal gap in and along said first inner member;
   - (d) then covering the first-named longitudinal gap between said second inner members with a thermally insulating strip to provide between said outer members a longitudinally extending second channel; and
   - (e) introducing a mass of the thermally insulating synthetic resin into and curing the same within said second channel to fill the latter with the cured thermally insulating synthetic resin.

5. A method according to claim 4, said thermally insulating synthetic resin being foamable.

6. A method according to claim 5, the foamable synthetic resin comprising polyurethane.

* * * * *